United States Patent
Besanson Tuma et al.

(10) Patent No.: US 11,501,215 B2
(45) Date of Patent: Nov. 15, 2022

(54) HIERARCHICAL CLUSTERED REINFORCEMENT MACHINE LEARNING

(71) Applicant: Accenture Global Solutions Limited, Dublin (IE)

(72) Inventors: Carlos Gaston Besanson Tuma, Barcelona (ES); Franz Naselli, Barcelona (ES); Sandra Orozco Martin, Barcelona (ES); Ernest Benedito Saura, Barcelona (ES); Lau Pera Itxart, Barcelona (ES); Anna Costa Vilar, Roda de Ter (ES)

(73) Assignee: Accenture Global Solutions Limited, Dublin (IE)

( * ) Notice: Subject to any disclaimer, the term of this patent is extended or adjusted under 35 U.S.C. 154(b) by 540 days.

(21) Appl. No.: 16/670,500

(22) Filed: Oct. 31, 2019

(65) Prior Publication Data
US 2020/0143291 A1 May 7, 2020

(30) Foreign Application Priority Data
Nov. 2, 2018 (EP) .................................... 18382785

(51) Int. Cl.
*G06N 20/20* (2019.01)
*G06N 5/04* (2006.01)
*G06Q 10/08* (2012.01)

(52) U.S. Cl.
CPC ............... *G06N 20/20* (2019.01); *G06N 5/04* (2013.01); *G06Q 10/087* (2013.01)

(58) Field of Classification Search
CPC ........... G06Q 10/00–50/00; G06N 3/00–20/00

USPC ............................. 705/7.11–7.42; 706/1–900
See application file for complete search history.

(56) References Cited

U.S. PATENT DOCUMENTS

| | | | | |
|---|---|---|---|---|
| 9,147,218 | B2* | 9/2015 | Leonard | G06Q 40/06 |
| 2001/0044766 | A1* | 11/2001 | Keyes | G06Q 40/00 |
| | | | | 705/36 R |
| 2002/0099519 | A1* | 7/2002 | Srivastava | G06N 20/00 |
| | | | | 702/181 |
| 2013/0226639 | A1* | 8/2013 | Yokoyama | G06Q 10/06 |
| | | | | 705/7.14 |
| 2013/0262349 | A1* | 10/2013 | Bouqata | G06N 20/10 |
| | | | | 706/12 |

(Continued)

OTHER PUBLICATIONS

Extended European Search Report dated May 17, 2019 for European patent application No. 18382785.6.

*Primary Examiner* — Alan S Miller
(74) *Attorney, Agent, or Firm* — Plumsea Law Group, LLC

(57) ABSTRACT

A system and method for hierarchical, clustered reinforcement learning is disclosed. A plurality of subject objects may be obtained, and a plurality of clusters of the subject objects may be determined. Clustered reinforcement learning may be performed on each cluster, including training a respective cluster agent for the each cluster. A first cluster of the plurality of clusters may be selected for revision based on selection criteria. After selection of the selected first cluster, individual reinforcement learning may be performed on each individual subject object included in the selected first cluster, including training a respective individual agent for the each individual subject object. An action may be controlled based on a result of the hierarchical, clustered reinforcement learning.

20 Claims, 17 Drawing Sheets

(56) References Cited

U.S. PATENT DOCUMENTS

| | | | | |
|---|---|---|---|---|
| 2014/0180975 A1* | 6/2014 | Martinez | ............... | H04W 4/08 |
| | | | | 706/12 |
| 2017/0255862 A1* | 9/2017 | Li | ..................... | G06F 16/9035 |
| 2018/0082213 A1* | 3/2018 | McCord | ............... | G06N 20/00 |

* cited by examiner

Initialize a table Q(s,a) to zero for all state-action pairs (s,a)
Observe the current state s Repeat until convergence:

1. Select an action *a* and apply it
2. Receive reward *r*
3. Observe the new state *s'*
4. Update the table entry for Q(s,a) according to:

$$Q(s,a) \leftarrow \underbrace{Q(s,a)}_{\text{old value}} + \underbrace{\alpha}_{\text{learning rate}} \left[ \underbrace{r'}_{\text{reward}} + \underbrace{\gamma}_{\text{discount factor}} \underbrace{\max_{a'} Q(s',a')}_{\text{expected optimal value}} - \underbrace{Q(s,a)}_{\text{old value}} \right]$$

5. Move to next state *s <- s'*

*FIG. 10*

```
qlearning <- function(n, s_0, s_terminal, epsilon, learning_rate) {
  # initialize state-action function Q to zero
  Q <- matrix(0, nrow=length(states), ncol=length(actions))
  dimnames=list(states, actions))
  # perform n episodes/iterations of Q-learning
  for(i in 1:n) {                                                              ─── Performs a given number n of episodes
    Q <- learnepisode(s_0, s_terminal, epsilon, learning_rate, Q)
  }                                                                                          1202
  return(Q)
} learnepisode <- function(s_0, s_terminal, epsilon, learning_rate, Q) {
  state <- s_0
  # set cursor to initial state
  while (state != s_terminal) {
    # epsilon-greedy action selection
    if (runif(1) <= epsilon) {                                                 ─── In each episode, update Q until final state
      action <- sample(actions, 1)                                                  is reached
      # pick random action
    }                                                                                            1202
    else {
      action <- which.max (Q[state, ])
      # pick first best action
    }
    # get next state and reward from environment
    response <- simulateenvironment(state, action)
    # update rule for Q-learning
    Q[state, action] <- Q[state, action] + learning_rate*(response$reward +max(Q[response$state, ]) - Q[state, action])
    state <- response$state
    # move to next state
  }
  return(Q)
}
```

*FIG. 12B*

```
epsilon <- 0.1
learning_rate <- 0.1 set.seed(0)
Q <- Qlearning(1000, "s0", "s3", epsilon, learning_rate)
Q actions[max.col(Q)]
```

```
> Q
        up         left        down        right
s0 -79.962619 -81.15445  -68.99532  -79.34825
s1 -73.881863 -52.43183  -52.67565  -47.91828
s2  -8.784844 -46.32207  -17.97360  -20.29088
s3   0.000000   0.00000    0.00000    0.00000
> actions[max.col(Q)]
[1] "down"  "right"  "up"  "up"
```

Optimal policy — 1220

HIERARCHICAL CLUSTERED REINFORCEMENT MACHINE LEARNING

CROSS-REFERENCE TO RELATED APPLICATIONS

This application claims the benefit of European Patent Application Number 18382785.6, filed Nov. 2, 2018, and titled "Hierarchical Clustered Reinforcement Machine Learning," which is incorporated by reference herein in its entirety.

TECHNICAL FIELD

The present disclosure generally relates to reinforcement machine learning. More specifically, the present disclosure generally relates to hierarchical, clustered reinforcement machine learning. Further, the present disclosure generally relates to a system and method for hierarchical, clustered reinforcement machine learning.

BACKGROUND

Machine learning is widely utilized in many different scenarios. For example, supervised learning techniques may learn from pairs that include an input object and a desired output value. Unsupervised learning techniques may learn from test data that has not been labeled, classified, or categorized (e.g., to determine hidden structure in unlabeled data). Reinforcement learning techniques may learn from interacting with the environment, with no need for pairs of input and correct outcome. Feedback data may include a reward signal.

For example, machine learning techniques may be used in automated forecasting for objects. An actual process of forecast revision may include revising 100% of the automated forecasts for the objects, while in many cases only about 30% of final submissions are different from any of the automated forecasts.

Additionally, automated forecast systems may not use context information, and may produce inaccurate results.

There is a need in the art for a system and method that addresses the shortcomings discussed above.

SUMMARY

A system and method for hierarchical, clustered reinforcement learning is disclosed. The system and method solves the problems discussed above by intelligently processing subject objects to achieve higher accuracy, in less time than conventional systems. In some embodiments, an autonomous planner may automatically select forecasts for subject objects. Such an autonomous planner may improve the speed and accuracy of determining optimal forecasts for the subject objects.

Instead of revising all automated forecasts, subject objects are clustered, and reinforcement learning is performed on each cluster. In some embodiments, based on histories of quality of past results, clusters are selected for revision. For clusters selected for revision, reinforcement learning is performed on each individual subject object in each selected cluster, to better determine optimal solutions for those individual subject objects, thus providing a more focused analysis on those subject objects, instead of spending revision time on subject objects in the clusters not selected for revision. Therefore, expert knowledge may be better focused on the objects in the selected clusters. In this way, the revised subject objects may receive a more accurate result, while conserving time and system resources by not revising the non-selected clusters. Further, multiple reinforcement learning agents for multiple subject objects may be trained in parallel to provide more accurate, more timely, more efficient results.

Additionally, the performance of example techniques and autonomous planners may be tracked. Further, a combination of both machine and human skills may provide an optimized division of tasks.

Also, the flexibility of techniques discussed herein may ensure that changes in the behavior of a subject object or a planner are quickly reflected in the decisions taken.

In one aspect, the disclosure provides a method of determining a result of hierarchical, clustered reinforcement learning. A plurality of subject objects may be obtained, and a plurality of clusters of the subject objects may be determined. Clustered reinforcement learning may be performed on each cluster, including training a respective cluster agent for the each cluster. A first cluster of the plurality of clusters may be selected for revision based on selection criteria. After selection of the selected first cluster, individual reinforcement machine learning may be performed on each individual subject object included in the selected first cluster, including training a respective individual agent for the each individual subject object. An action may be controlled based on the result of the hierarchical, clustered reinforcement machine learning.

In another aspect, the disclosure provides a non-transitory computer-readable medium storing software that may comprise instructions executable by one or more device processors to determine a result of hierarchical, clustered reinforcement machine learning by: obtaining a plurality of subject objects, determining a plurality of clusters of the subject objects, performing clustered reinforcement machine learning on each cluster of the plurality of clusters, including training a respective cluster agent for the each cluster, selecting a first cluster of the plurality of clusters for revision based on selection criteria, and after selection of the selected first cluster, performing individual reinforcement machine learning on each individual subject object included in the selected first cluster, including training a respective individual agent for the each individual subject object. An action may be controlled based on the result of the hierarchical, clustered reinforcement machine learning.

In another aspect, the disclosure provides a system that includes a device processor and a non-transitory computer readable medium storing instructions that are executable by the device processor to determine a result of hierarchical, clustered reinforcement machine learning by: obtaining a plurality of subject objects, determining a plurality of clusters of the subject objects, performing clustered reinforcement machine learning on each cluster of the plurality of clusters, including training a respective cluster agent for the each cluster, selecting a first cluster of the plurality of clusters for revision based on selection criteria, and after selection of the selected first cluster, performing individual reinforcement machine learning on each individual subject object included in the selected first cluster, including training a respective individual agent for the each individual subject object. An action may be controlled based on the result of the hierarchical, clustered reinforcement machine learning.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 depicts an example Q-learning technique;

FIG. 11 depicts an example state diagram;

FIGS. 12A-12C illustrate example code associated with an example state diagram;

FIG. 13 depicts navigation of an example state diagram;

DESCRIPTION OF EMBODIMENTS

Figure 1:
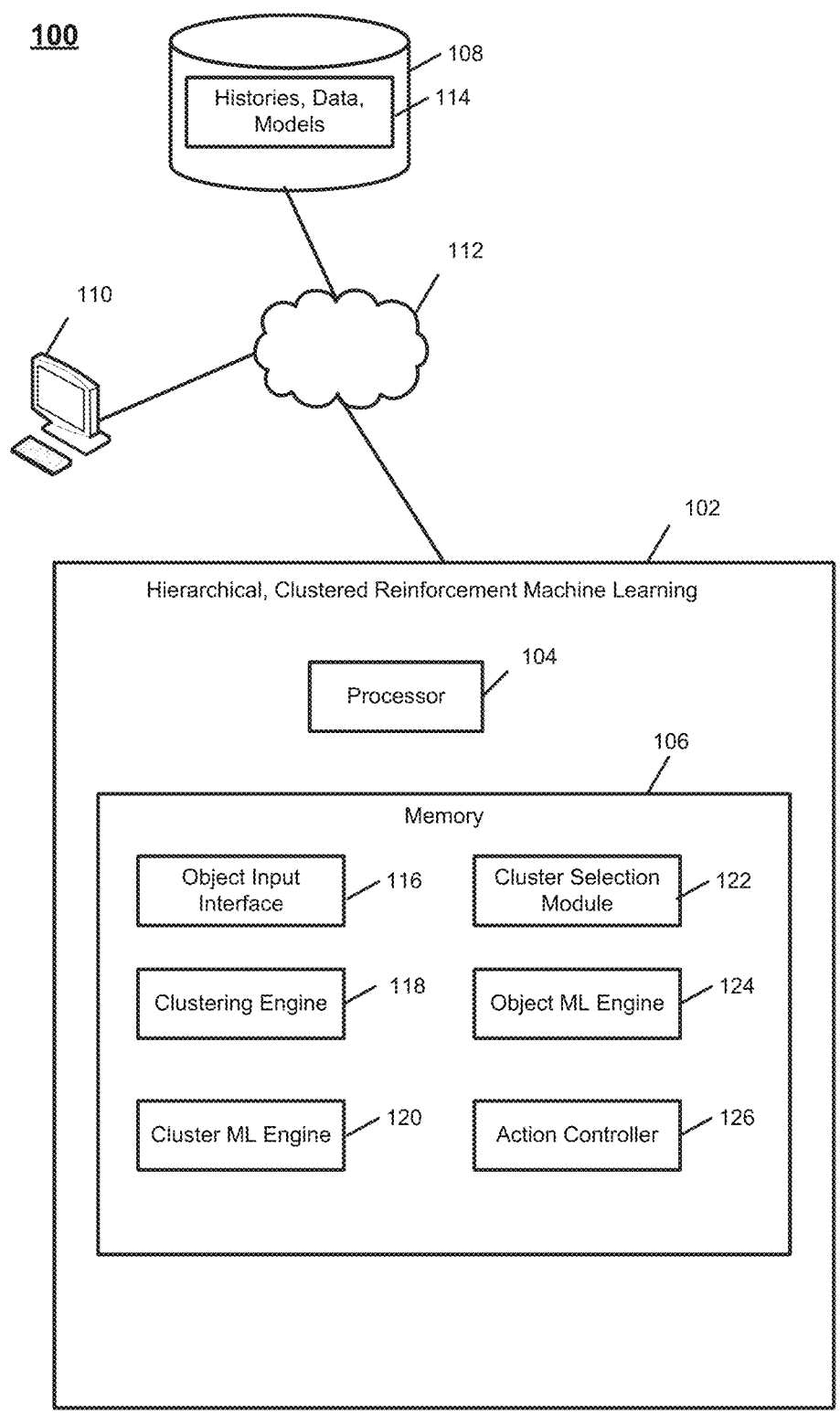
FIG. 1 is a schematic diagram of an embodiment of a system for hierarchical, clustered reinforcement learning.

A system and method for hierarchical, clustered reinforcement learning is disclosed. FIG. 1 shows an embodiment of a hierarchical, clustered reinforcement learning system 102. As shown in the embodiment of FIG. 1, the system 102 includes a processor 104 and a memory 106 storing components of the system 102. Processor 104 may include a single device processor located on a single device, or it may include multiple device processors located on one or more physical devices. Memory 106 may include any type of storage, which may be physically located on one physical device, or on multiple physical devices. The system 102 may communicate with a user device 110, for example, to receive user input. For example, the system 102 may communicate with user device 110 via a network 112. In some embodiments, network 112 may be a wide area network ("WAN"), e.g., the Internet. In other embodiments, network 112 may be a local area network ("LAN"). For example, in a more remote location far from a metropolitan area, the Internet may not be available. In yet other embodiments, network 112 may be a combination of a WAN and a LAN.

As shown in FIG. 1, the system 102 may communicate with a repository 108 storing data, histories, and models 114, for example, to store and retrieve information for processing data. For example, the data may include forecasts, and the histories may include historical data associated with automated forecasts. For example, the models may include machine learning models.

The system may include several modules. For example, FIG. 1 shows system 102 including an object input interface 116, a clustering engine 118, a cluster machine learning (ML) engine 120, a cluster selection module 122, an object ML engine 124, and an action controller 126. Object input interface 116 may obtain subject objects. In some embodiments, the subject objects may represent entities such as products or persons.

Clustering engine 118 may determine a plurality of clusters of the subject objects. In some embodiments, the clusters may be determined based on categories of the subject objects. For example, A/B/C classification may be used, where A objects typically represent approximately 20% of the volume, and 80% of the value. As another example, X/Y/Z/classification may be used, where Z objects are those with a higher variability and those which are most difficult to predict. Statistical characteristics may also be used (e.g., intermittency, seasonality, etc.). Cannibalization (e.g., grouping objects with highly correlated sales) may also be used. Another technique may include error clustering, grouping objects with similar error characteristics (e.g., peak sales, over/under forecast, etc.). Other possible groupings may include business unit, category, brand, etc. Time series (TS) key performance indicators (KPIs) may be used to perform the clustering.

Cluster ML engine 120 may perform clustered reinforcement learning on each cluster of the plurality of clusters, including training a respective cluster agent for the each cluster. In some embodiments, a single Q matrix may be determined for each group, thereby increasing efficiency by allowing transfer of information for objects determined as related by the clustering. In some embodiments, after performing the clustered reinforcement learning on each cluster of the plurality of clusters, it may be determined whether to revise the each cluster.

Cluster selection module 122 may select a first cluster of the plurality of clusters for revision based on selection criteria. In some embodiments, selecting the first cluster of the plurality of clusters for revision is based on a determination to revise the each cluster. In some embodiments, determining whether to revise the each cluster includes analyzing a history of determined quality values of prior results of hierarchical, clustered reinforcement learning.

After selection of the selected first cluster, object ML engine may perform individual reinforcement learning on each individual subject object included in the selected first cluster, including training a respective individual agent for the each individual subject object. In some embodiments, a single Q matrix may be determined for each individual subject object, thereby ensuring precision, while avoiding revising the whole initial group of subject objects.

Action controller 126 may control an action based on a result of the hierarchical, clustered reinforcement learning. Determining the result may include obtaining an autonomous planner. In some embodiments, controlling the action based on the result of the hierarchical, clustered reinforcement learning includes controlling the action via an autonomous planner. In some embodiments, controlling the action based on the result of the hierarchical, clustered reinforcement learning includes controlling the action based on one of the clusters that is not selected by the selecting for revision.

For example, the subject objects may include stock keeping units (SKUs), and controlling the action based on the result of the hierarchical, clustered reinforcement learning includes controlling the action based on a forecast associated with one of the SKUs. For example, controlling the action based on the result of the hierarchical, clustered reinforcement learning may include controlling the action via an autonomous planner that selects a forecast from a plurality of available forecasts associated with one of the subject objects.

Figure 2:
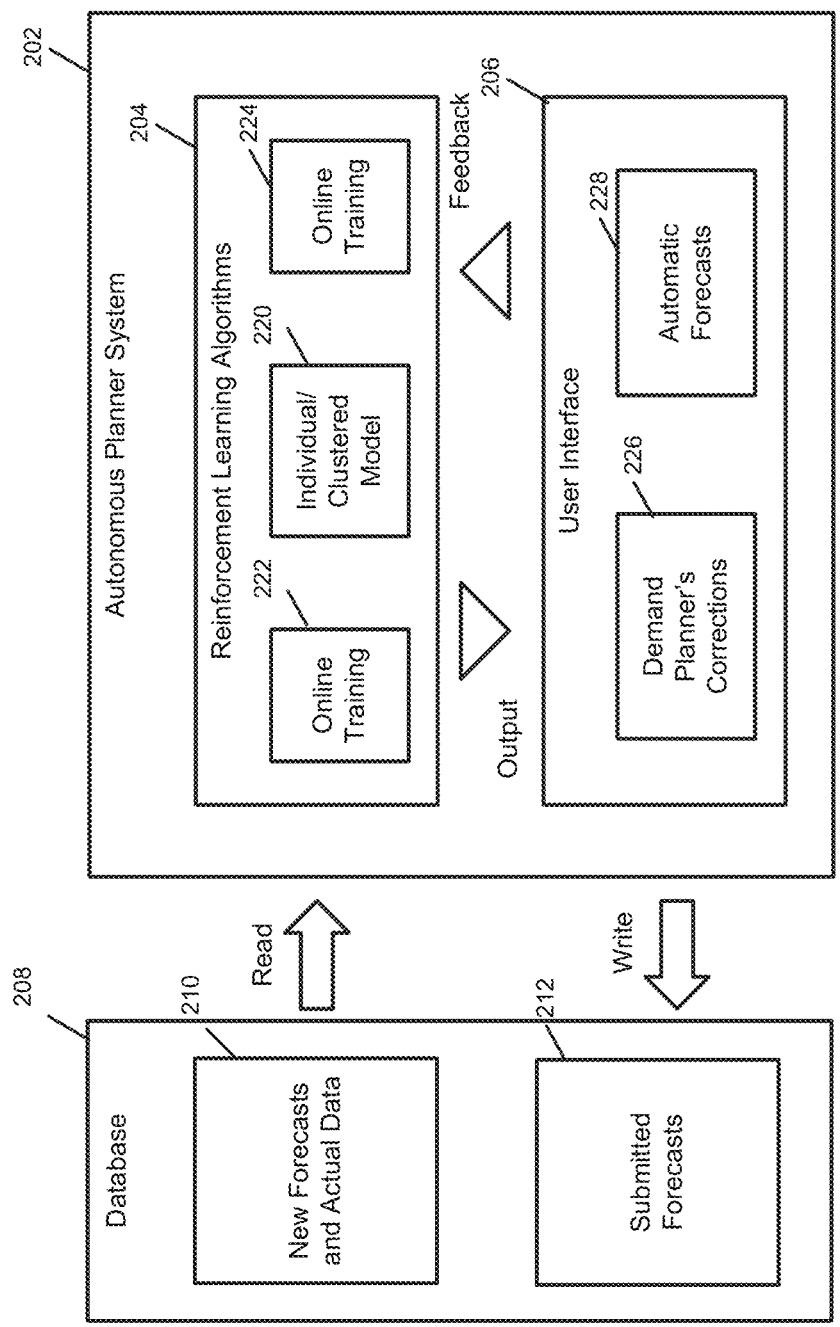
FIG. 2 is a schematic diagram of an embodiment of an autonomous planner system.

FIG. 2 illustrates a schematic diagram of an example autonomous planner system 202 that includes reinforcement learning algorithms 204 and a user interface 206. Autonomous planner system 202 communicates with a database 208, for example, to input data 210 such as new forecasts and actual data, and to output, for example, submitted forecasts 212. As shown in FIG. 2, reinforcement learning algorithms 204 includes individual/clustered models 220, with online training 222 and 224. An output of reinforcement learning algorithms 204 to user interface 206 may receive a demand planner's corrections 226. For example, the demand planner may use the client device 110 of FIG. 1 to apply corrections, using an automated tool. Automatic forecasts 228 may be sent as feedback to reinforcement learning algorithms 204.

Example reinforcement learning algorithms may include R code, PYTHON code, and TENSORFLOW software. An example user interface 206 may include an R SHINY user interface. For example, user interface 206 may include HTML, CSS, and/or JS code, and may utilize AMAZON WEB SERVICES, MICROSOFT AZURE. For example, database 208 may include a MYSQL database, SAP HANA, and/or OPEN DATA PROTOCOL (ODATA).

In one approach, multi-armed bandits (MABs) may be used for forecasting. Agents may learn from the environment what the optimal behavior is at a particular moment. A MAB is an algorithm designed to take decisions in a changing environment, learning at each step. For example, the Bandit takes a decision at a particular moment of time, balancing exploration and exploitation. Bandits may follow a defined distribution and simulate the environment accordingly. Parameters may be estimated from past data. Methods that may be used include mean absolute error and binary classification.

However, in order to integrate complex information about the environment (metadata, precise state at each time period, etc.) and in order to allow self-learning, a more complex algorithm may be used: reinforcement learning.

As discussed in more detail below, reinforcement learning may be model-based or model-free. A problem to solve may be formulated. Experience may be generalized, for example, by using available information to detect similar situations: "learning." Using sequential decisions, delayed gratification may be dealt with properly (e.g., "Planning"). Exploration/exploitation may be utilized by determining when to try new decisions instead of using the best expected one.

With model-based learning, a model of the environment is needed to determine a best policy. However, this may be very difficult or impossible in real-life scenarios.

With model-free learning, no deterministic model of the environment is needed. The environment may be defined using states, and the objective function to optimize (reward) may be determined.

When planners choose between multiple automated forecasts and/or decide to perform some additional modifications, they may base their decision making on the forecast accuracy of the last periods for each solution.

For a reinforcement learning algorithm to be able to mimic the planners' behavior accurately, some information must be provided so that it can learn the expected output of performing one action or another depending on the situation.

Example techniques discussed herein may define a finite number of states depending on the weighted forecast accuracy obtained during the last periods for each automated forecast and some thresholds. It may be noted that the accuracy resulting from the planners' decisions may be left out of the environment given that these will no longer be available once the system is used and not all forecasts are revised at each time period.

In some embodiments, the reward is the objective function to maximize. It may be used by the techniques to quantify the performance of taking one action or another. For example, in a forecasting scenario, the aim is to maximize the forecast accuracy. Therefore, the reward may be defined based on the accuracy obtained with the chosen forecast.

With this, one can ensure that when automated forecasts are inaccurate or an object has very short history, the planner will probably provide a useful insight and perform better than the automated forecasts. Therefore, the algorithm would send these objects to the planner for revision. If one of the automated forecasts is determined to have achieved a high measure of accuracy for the last periods, it can be expected that it will continue to do so. A planner revising this forecast may choose not to perform any additional modification. Products with promotions or affected by factors that are only known by the planner may also be sent for revision.

Thus, accuracy may be maximized while the number of revisions may be reduced significantly.

Q-Learning is one of the most popular model-free approaches. An example process can be summarized as shown in FIG. 3 and as discussed below.

Figure 3:
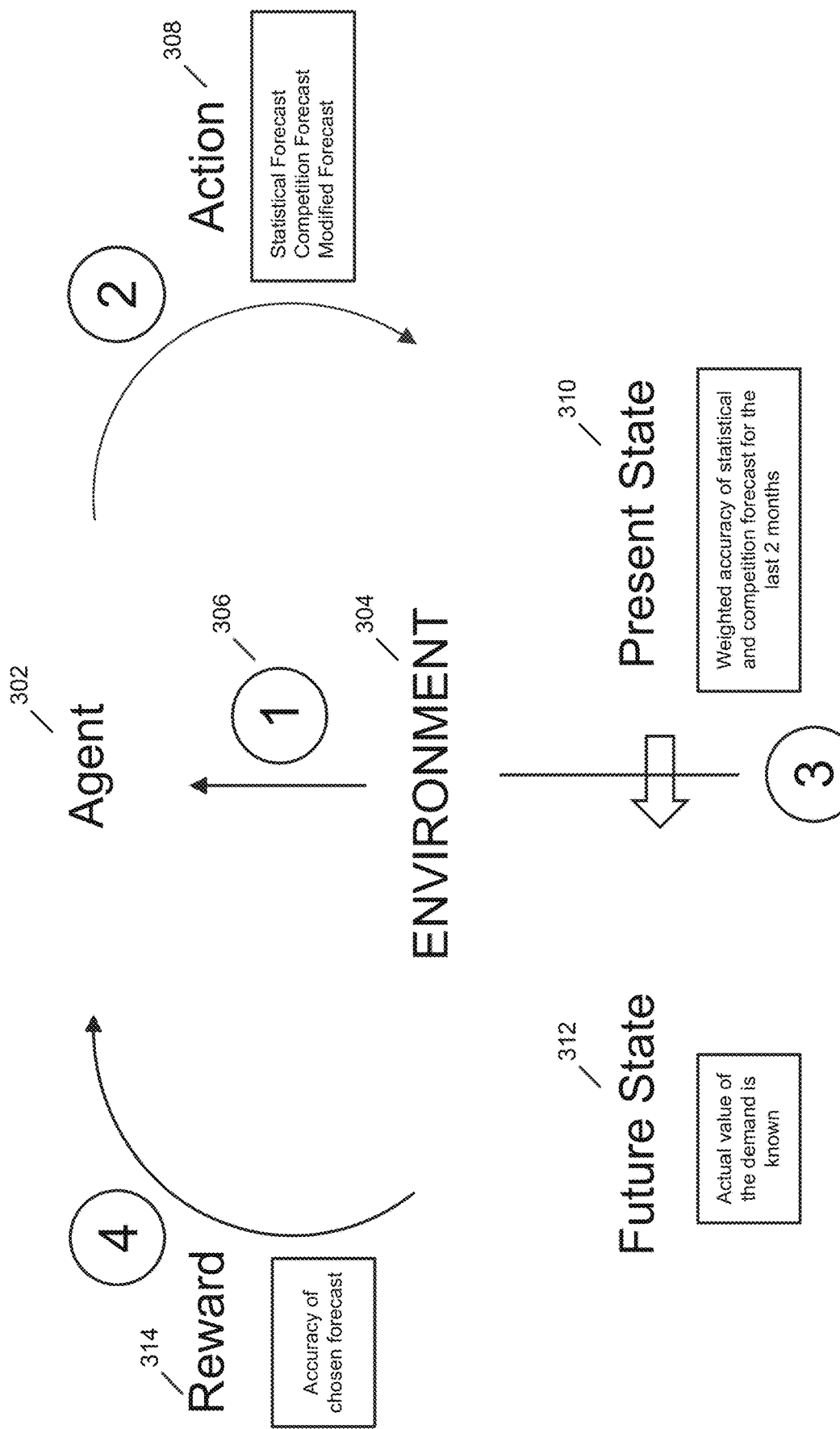
FIG. 3 is a schematic diagram of an embodiment of a system with states, rewards and actions.

As shown in FIG. 3, an agent 302 observes 306 its environment 304. According to its past experience, agent 302 chooses (308) one of the available forecasts (e.g., as an action). For example, available forecasts may include a statistical forecast, a competition forecast, and/or a modified forecast. As a result of the action, a present state 310 is advanced to a future state 312. For example, future state 312 may be determined based on a weighted accuracy of statistical and competition forecasts for the last 2 months. The actual value of the demand is known. A reward is computed (314) and agent 302 receives it as a feedback.

Example techniques discussed herein may utilize a temporal analysis, in contrast with conventional non-temporal analysis. Further, for example techniques discussed herein, actions may refer to conceptual decisions, in contrast to conventional techniques wherein actions may typically be associated to movements. For example techniques discussed herein, actions may not affect the environment, in contrast to conventional techniques wherein actions may change the environment.

Further, for example techniques discussed herein, states may represent distances to actual values, in contrast to conventional techniques wherein states are positions or clearly differentiated objects. Additionally, for example techniques discussed herein, states may be defined dynamically for each object, in contrast to conventional techniques wherein states are defined for the whole set of objects. For example techniques discussed herein, rewards may be redefined for each state, time period, and subject object, in contrast to conventional techniques which have finite and pre-defined reward sets. For example techniques discussed herein, learning may be leveraged by human behavior leading to self-learning, in contrast to conventional techniques wherein learning may be completely automated.

As another example, with deep reinforcement learning, a deep neural network may act as the agent used to map state-action pairs to rewards. In such a scenario, their learning involves finding the right coefficients or weights of the network. An advantage of such a technique is continuous states and, therefore, more flexibility and no loss of information. However, a substantially large amount of historical data may be needed, which may consume substantial processing/storage resources, which may adversely affect computational efficiency.

Example techniques discussed herein may provide a possible workaround, using clustered reinforcement learning.

Planners might dispose of information that is not inherent to the data itself and that could enrich the statistical forecasts. Therefore, contrary to many classical reinforcement learning techniques where the algorithm replaces the human, the strengths of both the planner and the algorithm may be combined to reach improved performance.

Further, example techniques herein may detect changes in each planner's performance (i.e., change of planner or product's features) and react accordingly.

Example techniques discussed herein may include a self-learning tool, that automatically adjusts its parameters as it interacts more with the different users of the tool. The adjustment may be performed after a pre-selected number of batches. Further, it could be after a predetermined period of time. This feature may avoid manually fixing the parameters and the need of having an expert user retraining the model.

Further, as new users use this tool, their profile can be matched by features to existing planners and leverage the already learned tuned parameters, thereby reducing the set up cost of interaction.

Moreover, once the tool is released, when more planner's tasks are integrated, there will be a transfer learning process from the actual task to the new one, also reducing the test up cost in the performance of the algorithm focusing in the new task (working as a pre-trained model).

Figure 4:
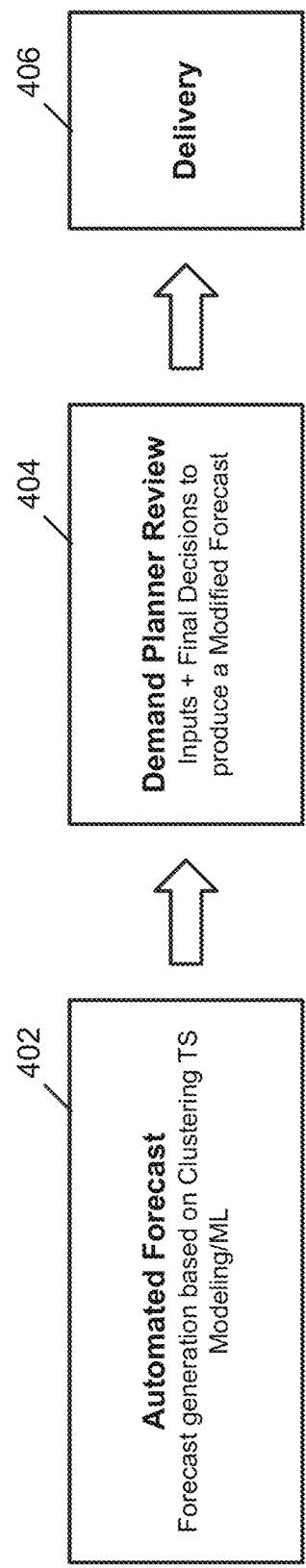
FIG. 4 is a depiction of an example demand planner.

In an example scenario, example techniques discussed herein may be used in forecasting services. FIG. 4 depicts an actual process using automated forecasts 402 for demand planner review 404, for delivery 405. As shown in FIG. 4, automated forecast 402 includes forecast generation based on clustering TS modeling/ML. Further, demand planner review 404 may include inputs and final decisions to produce a modified forecast for delivery 406.

In accordance with example techniques discussed herein, each period (month, week, day), multiple forecasts may be generated for each object and a planner may select which to use as a baseline or as a final forecast to deliver. Such techniques, based on the planner's decision history and simulation using reinforcement techniques, chooses between the available forecasts or sends the object for revision by the planner. The revision can be made directly from the tool, where the planner may decide which forecast to use, adding or subtracting quantities given new available information and save it directly to the data base (e.g., database 208).

Figure 5:
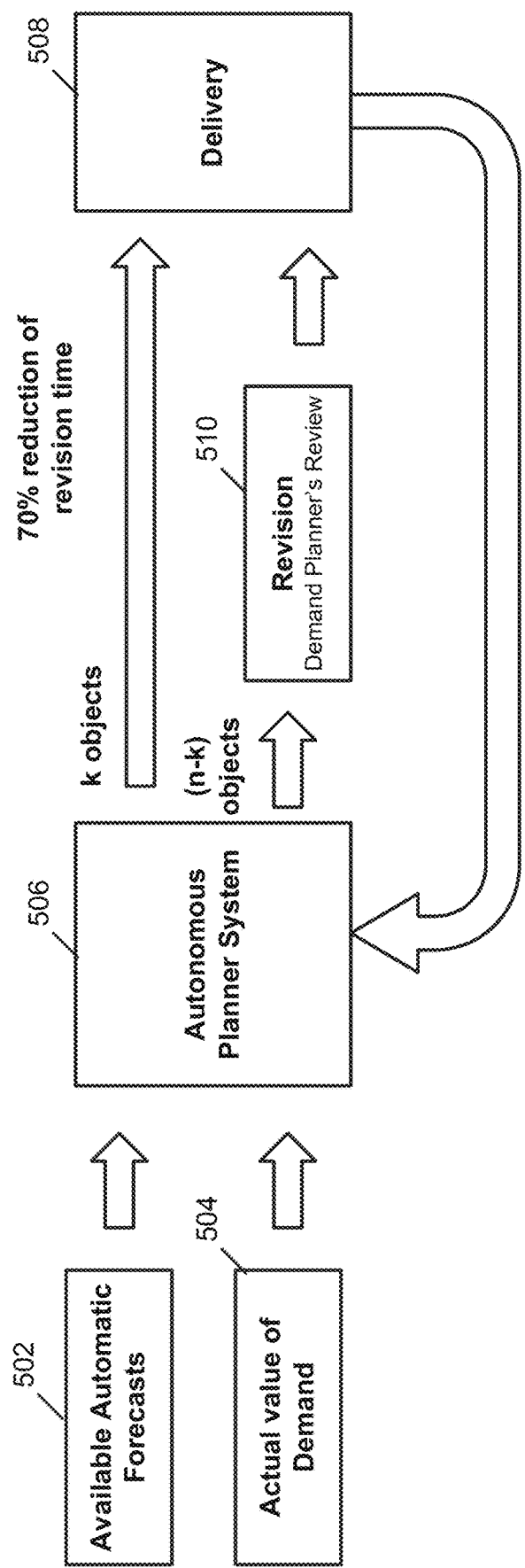
FIG. 5 is a schematic diagram of an example embodiment of an autonomous planner system.

FIG. 5 depicts a schematic diagram of an example embodiment of an autonomous planner system. As shown in FIG. 5, the process shown in FIG. 4 may be shifted by including a fully automated intermediate step between the statistical forecast output and the planners' final decision to submit as delivery over the whole range of objects (e.g., SKUs). As shown in FIG. 5, available automatic forecasts 502 and actual value of demand 504 may be input to an autonomous planner system 506. Autonomous planner system 506 may send k objects (e.g., k objects being 10, 1000, 10000 SKUs) directly to delivery 508 while a subset of the objects (e.g., n–k SKUs, where n depicts the total number of objects) may be sent to the team of planners to review (510) and submit for delivery 508. As shown in the example of FIG. 5, sending the k objects directly to delivery 508 may result in an advantageous 70% reduction of revision time.

In this way, example techniques discussed herein may provide a framework, where customized reinforcement learning processes may mimic the planner's behavior given past decisions and simulations, providing an advantageous balance between machine and human performance.

Figure 6:
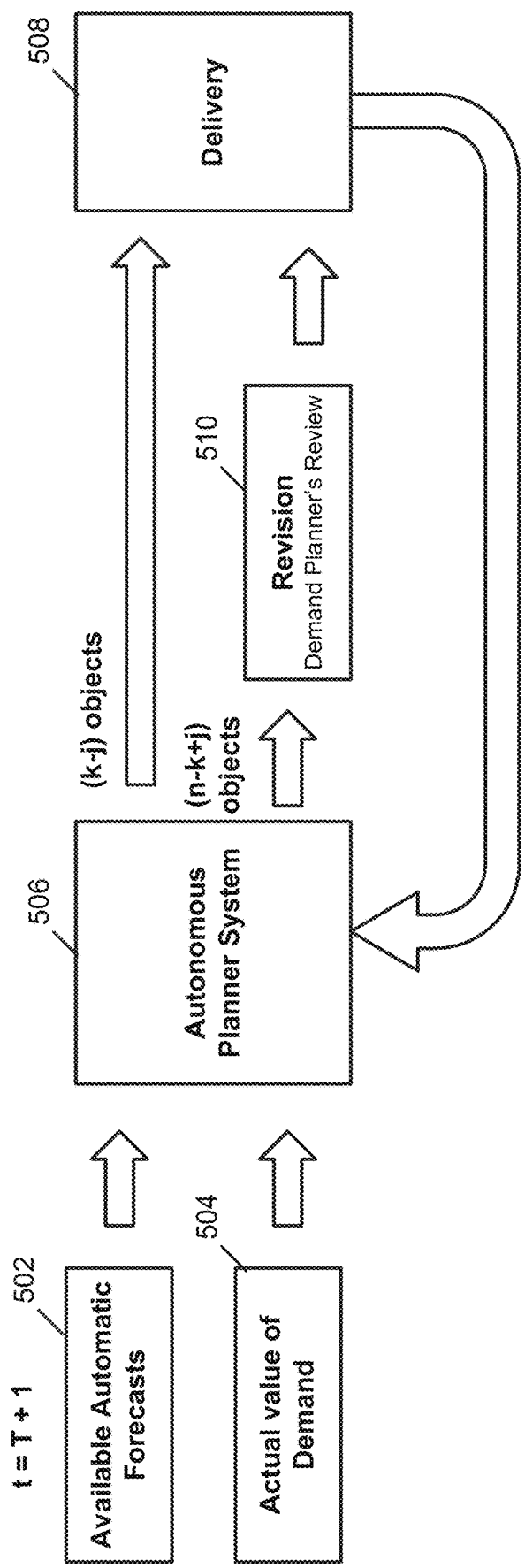
FIG. 6 is a schematic diagram of an example embodiment of an autonomous planner system.

FIG. 6 depicts a schematic diagram of an example embodiment of an autonomous planner system. In this example, success KPIs may be used at each time period t to update hyperparameters. For example, j objects that were automatically delivered on time period T are now revised on time period T+1. The outcome's performance may be assessed compared to the alternative of not revising and used in future time periods.

These automatic updates may ensure that the process does not stagnate in a same behavior and reacts quickly to sudden changes. If an object is revised, the other alternatives may also be simulated to use all the information available.

Figure 7A:
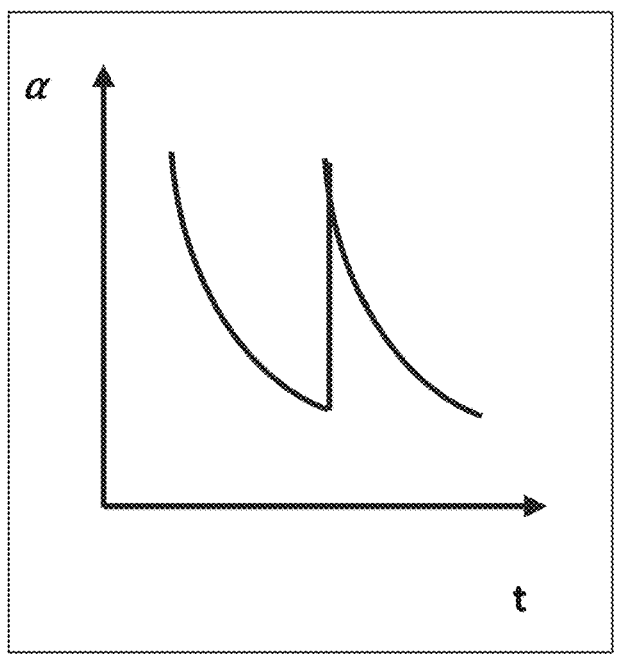
FIGS. 7A-7C depict examples of hyperparameters according to an embodiment.
Figure 7B:
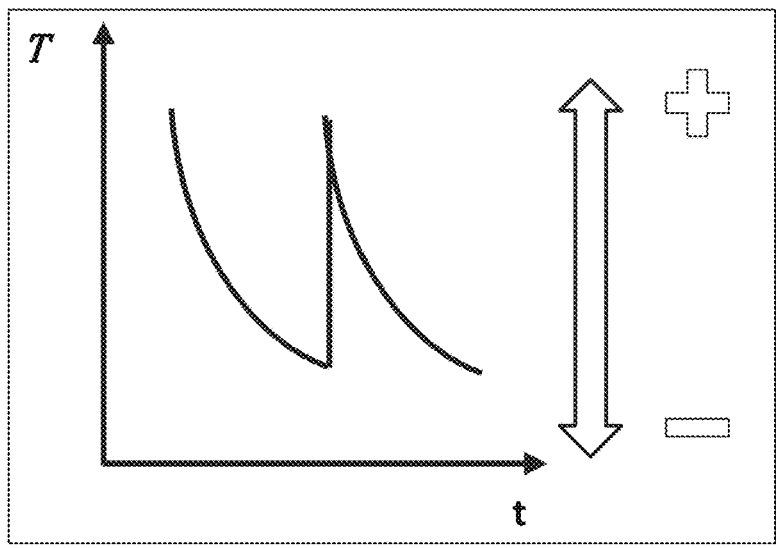
Figure 7C:
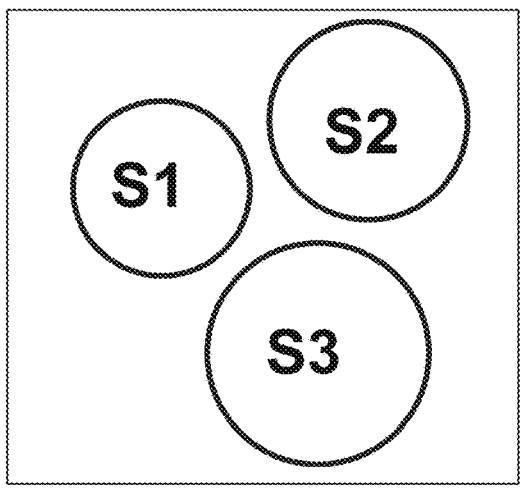

FIGS. 7A-7C depict examples of hyperparameters according to example embodiments. FIG. 7A depicts a learning rate a that decreases over time t. In some embodiments, if a significant change in an object's behavior or a planner's behavior (e.g., as determined by tracking and comparing using predetermined threshold values), the learning rate may be set up to its initial value. In this way, the learning rate may advantageously be smoothed out by modifying this hyperparameter.

FIG. 7B depicts a temperature T that may vary over time t. In some embodiments, and initial high temperature may be used for exploration, while exploitation may use decreasing temperature with time t. In some embodiments, a temperature parameter may be reset to a high temperature periodically to advantageously avoid stagnation.

FIG. 7C depicts a states definition (e.g., using defined states S1, S2, S3). Using this hyperparameter, thresholds may be redefined at each time period integrating new available information. In some embodiments, utilizing such a states definition hyperparameter may ensure balance between states. Further, flexibility may be advantageously increased without a need of retraining the process.

Figure 8:
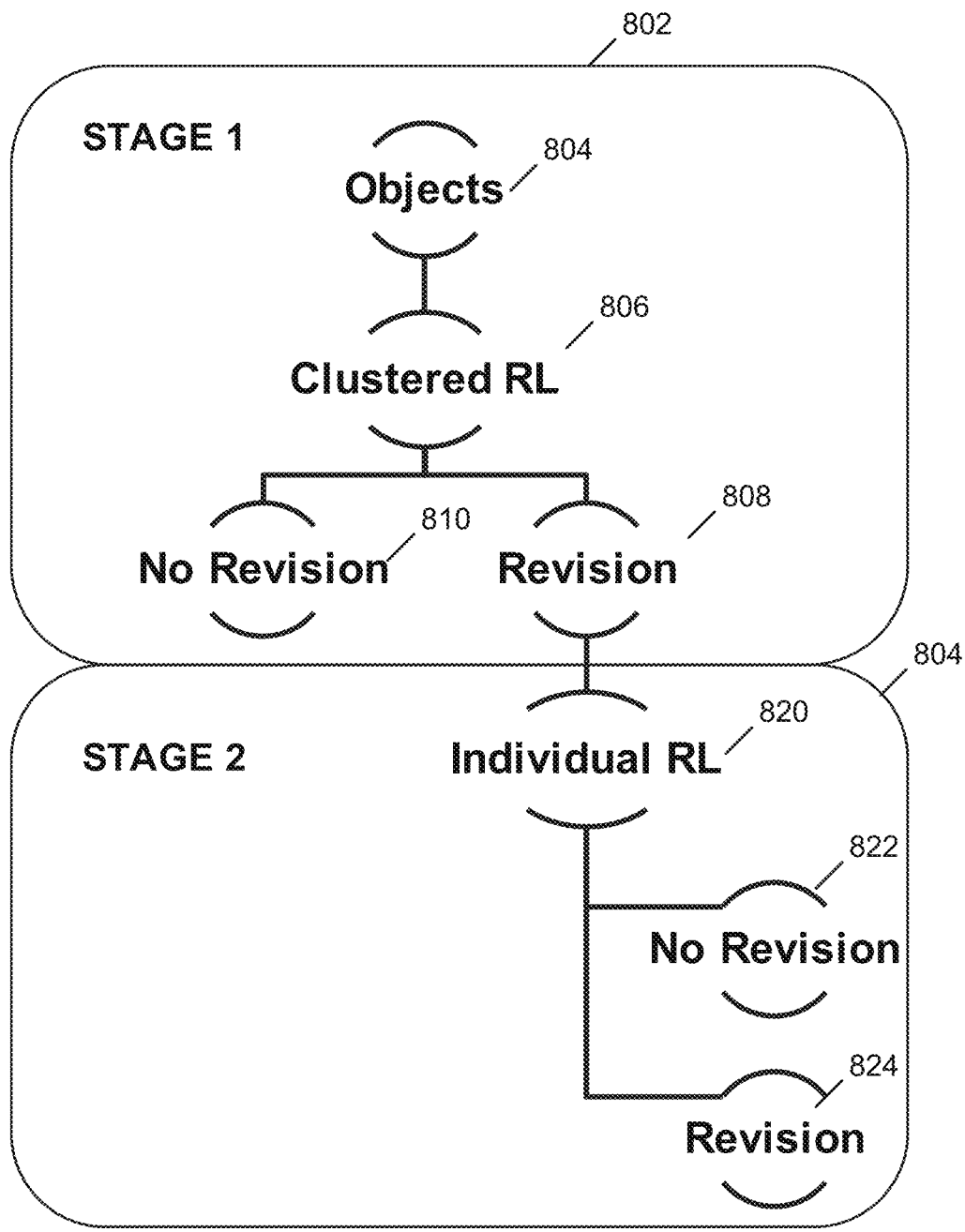
FIG. 8 is a schematic diagram of an embodiment of a system for hierarchical, clustered reinforcement learning according to an embodiment.

FIG. 8 depicts a schematic diagram illustrating an example system for hierarchical, clustered reinforcement learning according to an embodiment. As shown in FIG. 8, the system may include two stages, shown as stage 1 802 and stage 2 804. Thus, in some embodiments, hierarchical reinforcement learning divides a task into subtasks to advantageously work more efficiently. Similarly as discussed with regard to the example of FIG. 1, subject objects 804 may be obtained. In some embodiments, the subject objects may represent entities such as products (e.g., via SKUs) or persons (e.g., patients in a medical scenario).

A plurality of clusters of the subject objects may be obtained. In some embodiments subject objects may be segmented according to diverse criteria, which may be used to prioritize the revision of revision of objects that are determined as being the most important and complicated in terms of forecasting. In some embodiments, the clusters may be determined based on categories of the subject objects. For example, A/B/C classification may be used, where A objects typically represent approximately 20% of the volume, and 80% of the value. For A/B/C/classification, a scan may be performed over the complete dataset for labelling each subject object (i.e., a subject object may belong to group A, B, or C in relation to a set of subject objects, but not on its own). A subject object belong to cluster A at a particular point in time may be moved to cluster B for reasons affecting either the appearance or disappearance of subject objects in the set, or by significant changes in its volume/value, in relation to other subject objects.

As another example, X/Y/Z/classification may be used, where Z objects are those with a higher variability and those which are most difficult to predict. Statistical characteristics may also be used (e.g., intermittency, seasonality, etc.). For X/Y/Z/classifications, one or more thresholds over a coefficient of variation may be defined. A new subject object may thus immediately be added to a cluster with its individual assessment. Statistical characteristics (or Time Series KPIs) such a intermittency and seasonality may also be determined individually for each subject object. Cannibalization (e.g., grouping objects with highly correlated sales) may also be used. Another technique may include error clustering, which may be based on an analysis of the error resulting from previous forecasts, grouping together objects that are usually over- or under-forecasted, or with similar error characteristics (e.g., peak sales, etc.). Other possible groupings may include business unit, category, brand, which may be achieved via direct grouping at the respective selected level.

In some embodiments, a cluster identifier (ID) may be assigned to each respective cluster. In some embodiments, a column for cluster IDs may be added to an original dataset so that members of each respective cluster may be efficiently stored and speedily accessed via a filtering operation for the cluster ID column. Training may then be performed in a distributed manner, independently for each respective cluster.

The grouping of subject objects into clusters in a first reinforcement stage may advantageously improve accuracy, as the objects in each respective cluster may share characteristics (e.g., attribute values) that may be used to improve efficiency and accuracy.

Clustered reinforcement learning 806 may be performed on each cluster of the plurality of clusters, including training a respective cluster agent for the each cluster. In some embodiments, and in the case of a Q-Learning algorithm, a single Q matrix may be determined for each group, thereby increasing efficiency by allowing transfer of information for objects determined as related by the clustering. In some embodiments, running a clustered reinforcement learning algorithm includes creating a single Q matrix for each cluster. Thus, the single Q matrix may be associated with each subject object in the respective each cluster. Therefore, at each time period, a decision may be taken for all subject objects based on the same Q matrix, and a reward may be determined based on the outcome of this decision in each case. In contrast, when applying reinforcement learning to a single subject object, only its own history is utilized for training. Therefore, each subject object is associated with, at each time period its own Q matrix with which the next decision is taken.

In this regard, the training of separate Q matrices for each subject object may be determined as computationally expensive, while training one per cluster may advantageously reduce significantly this training time.

Additionally, the output may advantageously be unique for each cluster. Thus, some categories may automatically be classified by the end of this first stage.

Further, subject objects with limited historical data may advantageously benefit from the information transfer coming from other subject objects of their same cluster.

In some embodiments, after performing the clustered reinforcement learning 806 on each cluster of the plurality of clusters, it may be determined whether to revise 808 the each cluster. Clusters not selected for revision may not be revised 810.

In some cases, by planners' actions, the clusters determined as most valuable (e.g., A cluster) or determined as having the most noise (e.g., Z) of subject object may be sent to revision 808. Thus, the group itself may benefit from some input from the planner, but probably not all individual subject objects may need such input. For such cases, individual reinforcement learning 820 may be performed in order to determine which subject objects within the considered clusters may benefit from a planner's intervention (e.g., via revision 824).

Individual reinforcement learning 820 may include training one agent (i.e., one Q matrix, for the Q-Learning algorithms) for each subject object. This may advantageously ensure that subject objects with statistical forecasts determined as "good" or "acceptable" may tend not to be send to revision, and that the information of each particular subject object is used independently from that of the other subject object in its cluster. Further, if a planner is determined as being good at revising some subject objects within this group but not others, the technique may advantageously benefit from this information and filter them out.

Individual subject objects not selected for revision may not be revised 822. Performance of stage 2 804 may ensure that final decisions for each subject object may be obtained based on the respective object's own characteristics, thus avoiding revision of subject objects with longer histories that may have been assigned to clusters having subject objects with significantly shorter histories (e.g., significantly younger clusters).

By utilizing example techniques discussed herein, one may ensure the final set of subject objects to revise 824 may be determined as the minimum set that may be necessary, while avoiding training a different model for each of the subject objects.

As a contrast, conventional techniques may utilize manual revision of all subject objects, taking into account both numerical KPIs and business metadata. Further, conventional reinforcement learning may utilize manual revision of some specific subject objects, but may be determined as computationally expensive for sets of subject objects determined as being substantially large (e.g., big data). In contrast, hierarchical, clustered reinforcement learning techniques, as discussed herein, may include manual revision of some specific subject objects, but may be determined as advantageously computationally efficient and accurate, even for sets of subject objects determined as being substantially large.

In some embodiments, given Z planners usually performing the revision of subject objects and a new planner, the process used for the new planner may not require any set up time. For example, an existing model $RL_i^M$ may be selected based on metadata or hand-picked and the hyperparameters may be redefined accordingly (e.g., initially high learning rate, exploration given a higher weight than exploitation, etc.).

As another use case for example techniques discussed herein, reinforcement learning may be used in healthcare in the determination of optimal treatment policies. For example, taking data from patient characteristics for a specific disease, the historical treatment received and the patient's situation at the end of it, an agent may be trained to recommend an assignment treatment to either new or to readmitted patients.

This use case is similar to the forecasting framework discussed above, where the agent took the role of a planner. In this case, the agent may mimic the doctor's behavior, deciding the treatment (as an action) in some situations and requiring the doctor's knowledge in some others. For this use case, clustered and hierarchical reinforcement learning may include clustering based on kinds of diseases. For example, in a first step, each cluster may be assigned to a certain type of treatment.

In a second step, each patient may be given a particular treatment or assigned to the doctor. Doctor's decisions may be used to improve the performance in cases where human assessment may lead to improved results.

With regard to self-learning and tuning of parameters, in-line training and periodical randomization of actions may avoid stagnation. For example, the training of the process may be performed made over time, with each new time period. Further, actions may be periodically randomized to consider, for example, new treatments.

Another example use case may include scheduling. With regard to this problem, a finite set of resources may need to be distributed among tasks. The use of example techniques herein may allow an agent to mimic or simulate these scheduling decisions.

For example, in cybersecurity a process may be used to dynamically schedule cybersecurity analysts to minimize risk.

With regard to production planning (e.g., a job shop), multiple jobs may be processed on several machines. Each job includes a sequence of tasks, which are to be performed in a given order, and each task is to be processed on a specific machine. In this case, reinforcement learning may provide a flexible approach to the design of agents in situations where supervised learning may be impractical. Moreover, each machine could have a personalized scheduling agent taking decisions based on its local view on the plan.

With regard to a production planning example, for a particular task in a production line, there may be different machines available. For example, there may be three furnaces to choose between, each with slightly different characteristics and available programs. Depending on the type of product to be processed, the output quality may be different.

A reinforcement learning process may be able to select an option that may be determined as a "best" option for mature products, where multiple tests have already been performed and there is a substantially large amount of historical data available. For new products or products with special requirements (urgent order or special quality required), however, the knowledge of experienced planners might be beneficial.

Figure 9:
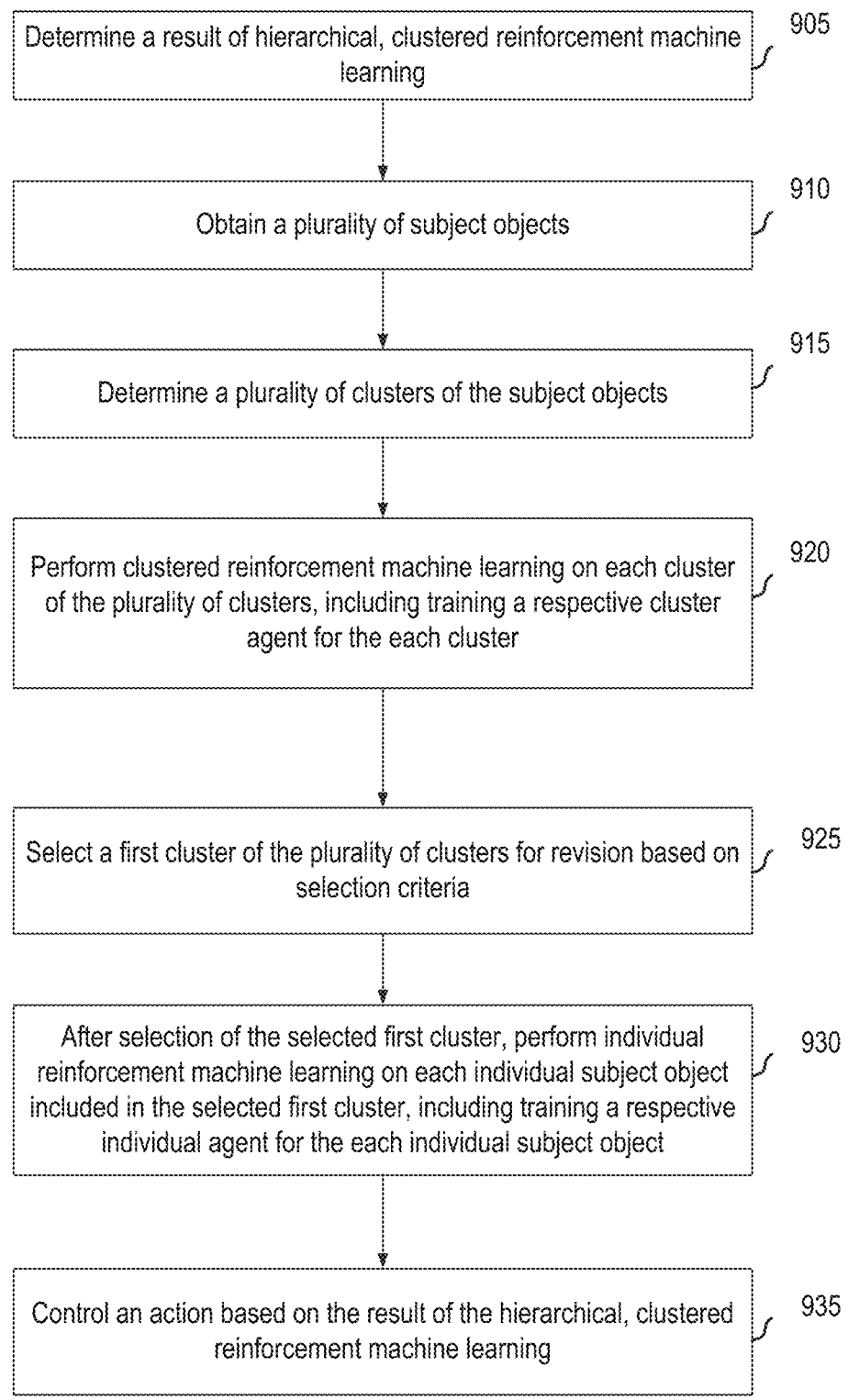
FIG. 9 is a flowchart of a method of hierarchical, clustered reinforcement learning according to an embodiment.

FIG. 9 is a flowchart of an example embodiment of a method of hierarchical, clustered reinforcement learning. As shown in FIG. 9, in step 905, a result of hierarchical, clustered reinforcement learning may be determined. In step 910, a plurality of subject objects may be obtained. In step 915, a plurality of clusters of the subject objects may be determined. In step 920, clustered reinforcement learning may be performed on each cluster of the plurality of clusters, including training a respective cluster agent for the each cluster. In step 925, a first cluster of the plurality of clusters may be selected for revision based on selection criteria.

In step 930, after selection of the selected first cluster, individual reinforcement learning may be performed on each individual subject object included in the selected first cluster, including training a respective individual agent for the each individual subject object. In step 935, an action may be controlled based on the result of the hierarchical, clustered reinforcement learning.

A more detailed discussion of reinforcement learning follows.

In accordance with example techniques discussed herein, as part of reinforcement learning, an agent may interact with its environment. The agent may take actions, and the environment may change according to the actions taken by the agent. Feedback includes a reward signal (e.g., a reward value) that indicates how well the agent is performing (e.g., a measure of the quality of performance of the agent). An example goal of reinforcement learning is to improve the behavior given only the reward signal feedback.

The agent may discover optimal behavior via trial-and-error learning. For example, as part of exploration, agents may try new or non-optimal actions to learn their reward. Using exploration, agents may gain a better understanding of the environment.

For example, as part of exploitation, agents may use current knowledge. While behavior may not yet be optimal, it may deviate only slightly.

Using restaurant selection as an example scenario, exploration may include trying a new restaurant, while exploitation may include going to a person's favorite restaurant.

Using game playing as an example scenario, exploration may include playing an experimental move, while exploitation may include playing the move a person believes is "best" (e.g., based on some analysis criteria).

As examples of techniques for exploration and exploitation, for ε- Greedy techniques, a random number ε may be selected such that 0≤ε≤1. For exploration, with probability ε, try a random action. For exploitation, with probability 1−ε, choose the current best. For example, a typical choice of ε is a selection of ε=0.1, decreasing over time.

A Softmax function may be utilized:

For each given state s, the probability that a particular action a is chosen is:

$$\pi(s, a) = \frac{\exp\left(\frac{Q(s, a)}{T}\right)}{\Sigma \exp\left(\frac{Q(s, b)}{T}\right)}$$

where T is the temperature, decreasing according to:

$T_{min}+(1-e)(T_{max}-T_{min})$ where e increases with the number of iterations.

Examples of learning algorithms include model-based learning algorithms and model-free learning algorithms. With regard to model-based learning algorithms, an aim is to find optimal policy and value functions. For example, the environment may be modeled as a Markov decision process (MDP) with transition probabilities. A model-based learning algorithm may learn the MDP model or an approximation of it. However, explicit models of the dynamics in the environment and transition probabilities are often not available even in simple cases.

With regard to model-free learning algorithms, an explicit model of the environment may not be available (transition probabilities are unknown). An example technique may derive the optimal policy without explicitly formalizing the model.

Monte Carlo techniques are simple but may converge slowly.

However, Q-learning techniques may be more efficient due to off-policy learning, which explores the environment and at the same time exploits the current knowledge. An example Q-learning technique is shown in FIG. 10.

As shown in FIG. 10, a table Q (s, a) (e.g., a Q matrix) may be initialized to zero for all state-action pairs (s, a). A current state s may be observed. Steps 1-5 (1002) as shown in FIG. 10 may then be repeated until convergence. As shown in step 4, equation 1004 updates table entries based on an old value, a learning rate, a reward value, a discount factor, an expected optimal value, and an old value, before the technique moves to a next state.

Figures 11, 12A:
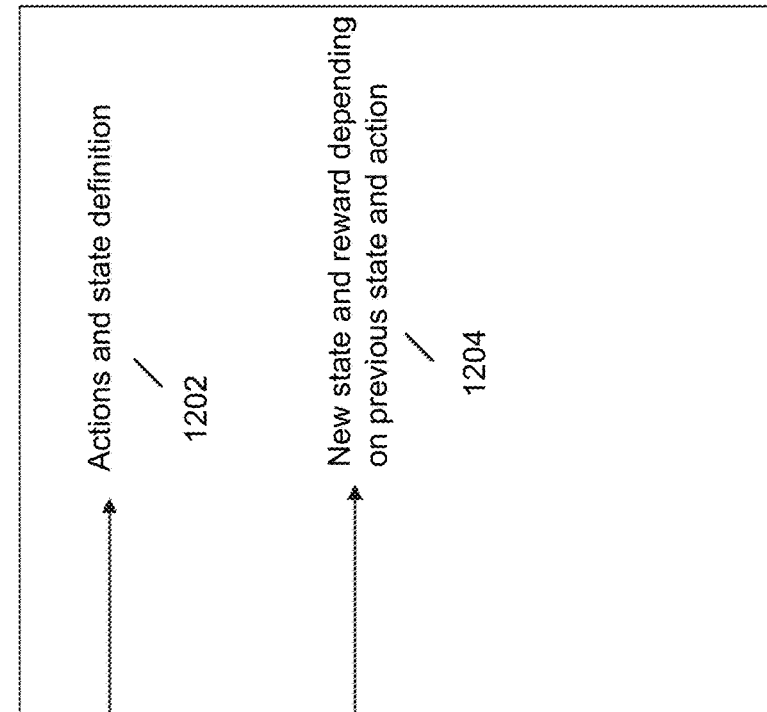

FIG. 11 depicts an example in which a goal may include traveling from $s_0$ to $s_3$, where possible navigable states include $s_0$, $s_1$, $s_2$, and $s_3$. As shown in FIG. 11, a wall prevents direct moves from $s_0$ to $s_3$. Further, visiting each square/state gives a reward of −1, while reaching the goal gives a reward of 10. Allowed actions are move left, move right, move up, and move down.

Figures 12C, 13:
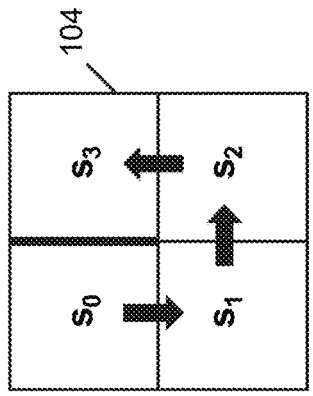

FIGS. 12A-12C illustrate example code for traveling from $s_0$ to $s_3$. For example, in FIG. 12A, code segment 1202 includes actions and state definitions. Code segment 1204 determines new states and rewards depending previous states and actions. In FIG. 12B, code segment 1206 performs a given number n of episodes. As shown in code segment 1208, in each episode, Q is updated until a final state is reached. FIG. 12C illustrates an optimal policy 1220 that is determined by the example code of FIGS. 12A-12C. FIG. 13 illustrates the movement from $s_0$ to $s_3$ using the optimal policy 1220 (e.g., actions down, right, up).

Figure 14:
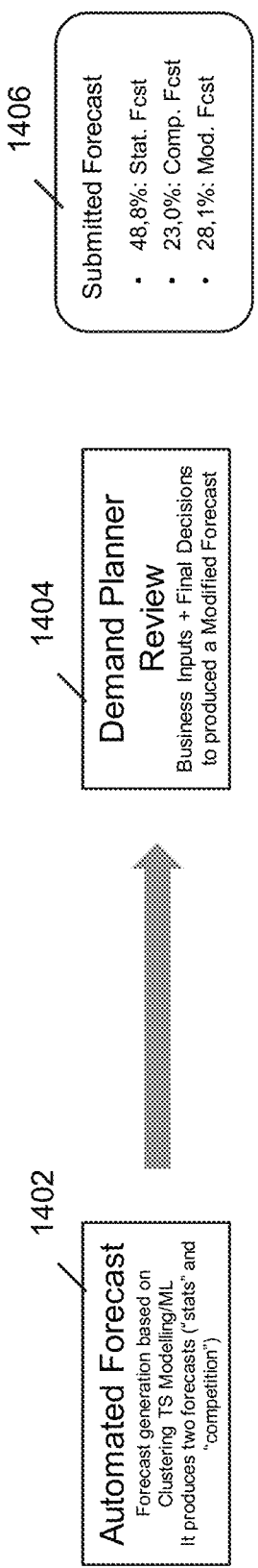
FIG. 14 depicts an example use case for a forecasting service.

FIG. 14 depicts an example use case of an actual process for a forecasting service. As shown in FIG. 14, there are 275 subject objects, and 1 year of data. As shown in FIG. 14, an automated forecast 1302 generated based on clustering TS modeling/ML produces two forecasts: "stats" and "competition." A demand planner review 1304 produces a modified forecast based on inputs and final decisions. A submitted forecast 1306 illustrates percentage values (e.g., measures of accuracy) for each of a statistical forecast, a competition forecast, and a modified forecast.

Figure 15:
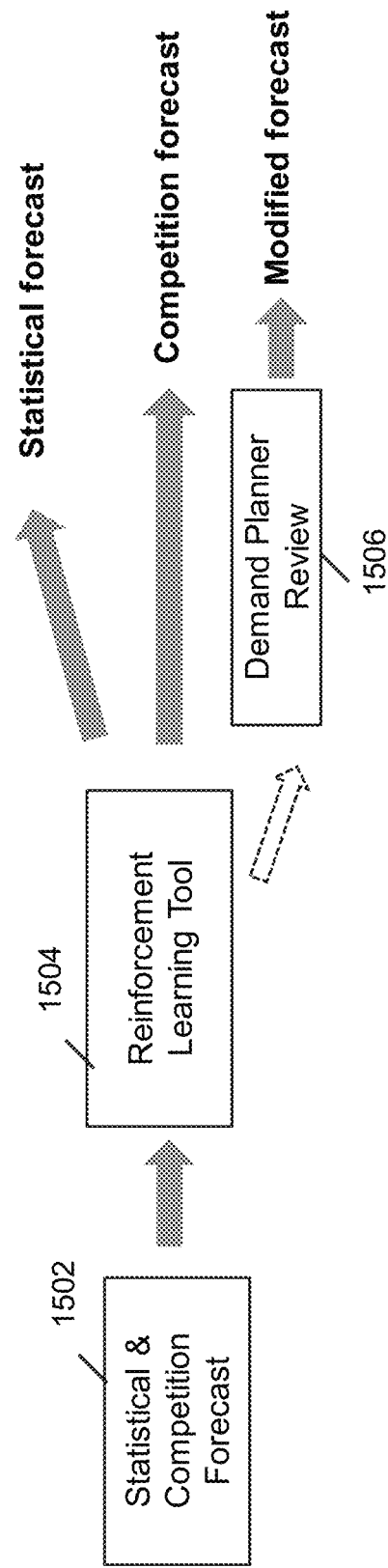
FIG. 15 is a schematic diagram of a reinforcement learning tool according to an embodiment.

FIG. 15 illustrates a reinforcement learning tool 1404 that receives statistical and competition forecasts 1502, to determine whether to select a demand planner review 1505, or to pass through the statistical forecast and the competition forecast, with no modification.

For such examples of reinforcement learning algorithms, the agent checks the present state of the environment: weighted accuracy of statistical and competition forecasts for the last 2 months. The agent then chooses between statistical, competition and modified forecasts. The environment then changes from a present to a future state: the actual value of the demand is known. For this example, the reward signal is the accuracy of the chosen forecast, and a goal includes selecting the forecast that maximizes the accuracy.

At time t, there may be 9 possible states. A state may be defined based on similarity between statistical forecast and actual value, and/or similarity between competition forecast and actual value.

Further, at time t, there may be 3 possible actions: use statistical forecast, use modified forecast, or use modified forecast. Softmax may be used for exploration, and temperature may decrease over time.

A reward is calculated for the actual state and the selected action. The Q matrix is updated, and the process is restarted for the next time period, following the current time period.

Figure 16:
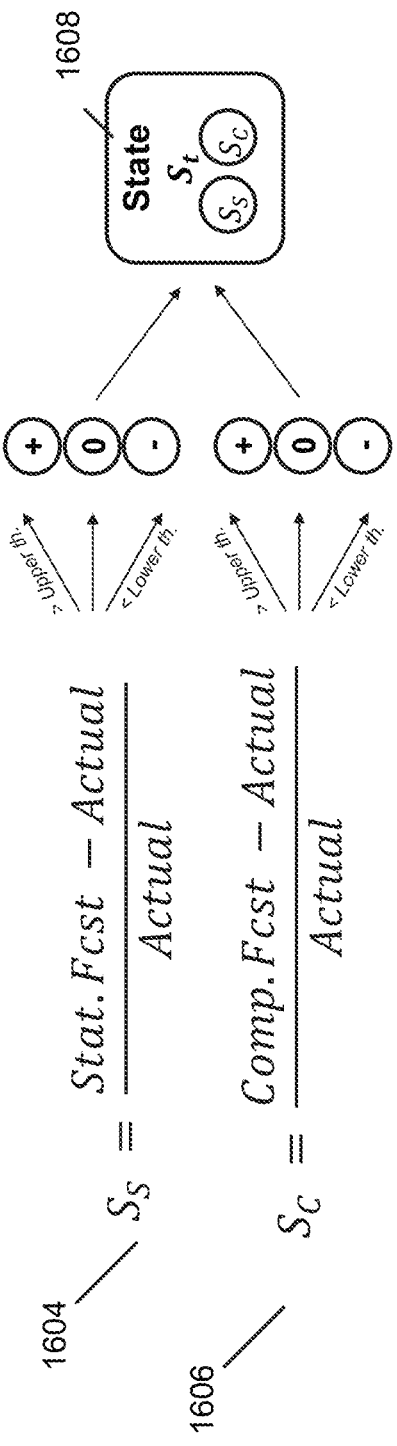
FIG. 16 depicts an example state definition according to an embodiment.

FIG. 16 depicts an example state definition 1602. As shown in FIG. 16 on temporal instant t a state may be defined based on both the statistical and the competition forecast. For the last 2 temporal periods (e.g., using historical data) a statistical forecast 1604 and a competition forecast 1606 may be generated based on actual values and predetermined upper and lower threshold values. In the example of FIG. 16, weights may be assigned to the performance values on each respective prior time periods. A pair of values (i.e., +/+, 0/−, etc.) is obtained and used to define the state $S_t$ (1608).

Figure 17:
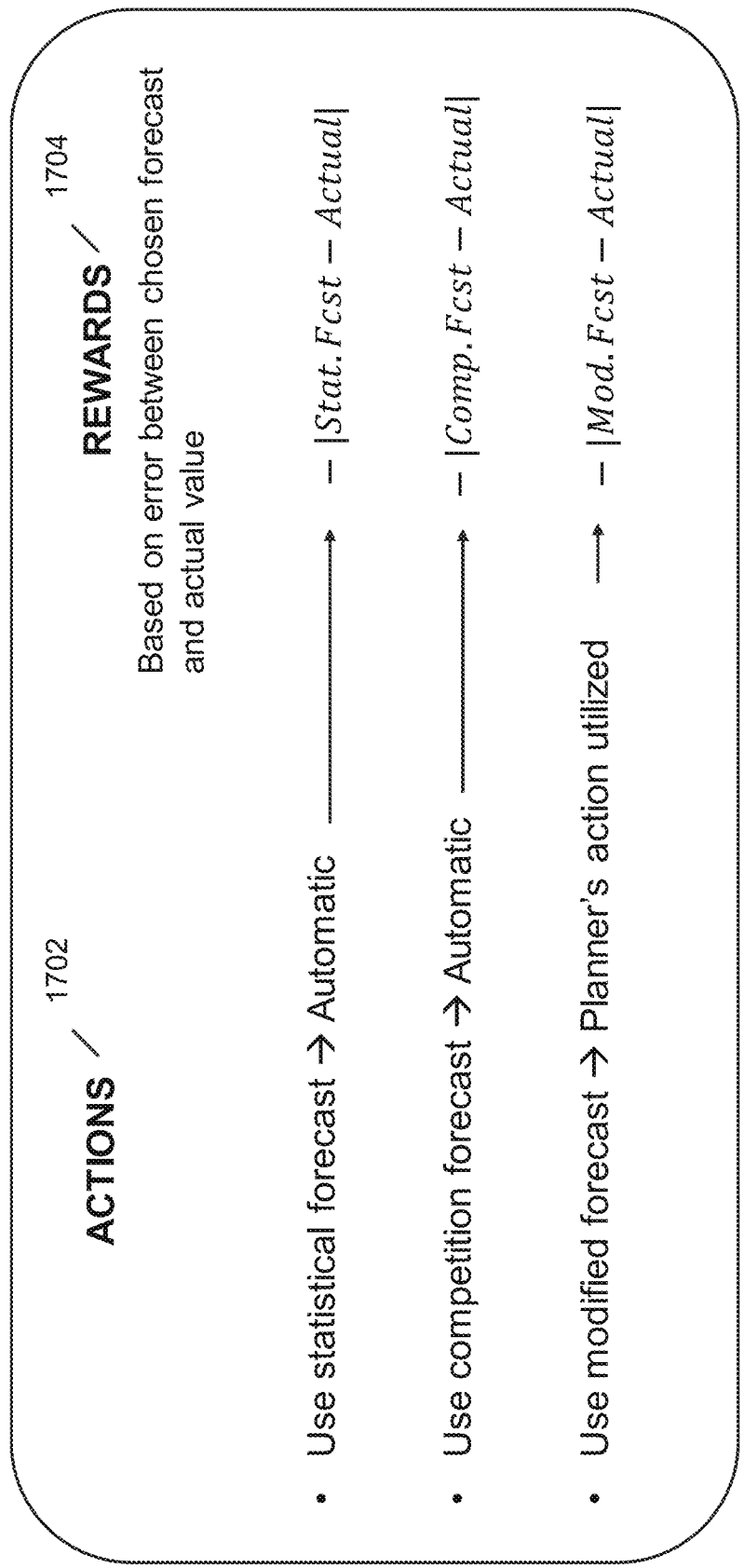
FIG. 17 illustrates example actions and rewards according to an embodiment.

FIG. 17 illustrates example actions 1702 and rewards 1704. As shown in FIG. 17, action 1702 may include using the statistical forecast, using the competition forecast, and using a modified forecast. As shown in FIG. 17, rewards 1702 are determined based on an error value between the selected forecast and the actual value. It may be noted that a reward may not be known prior to time t+1, at which point the actual value is known.

Figure 18:
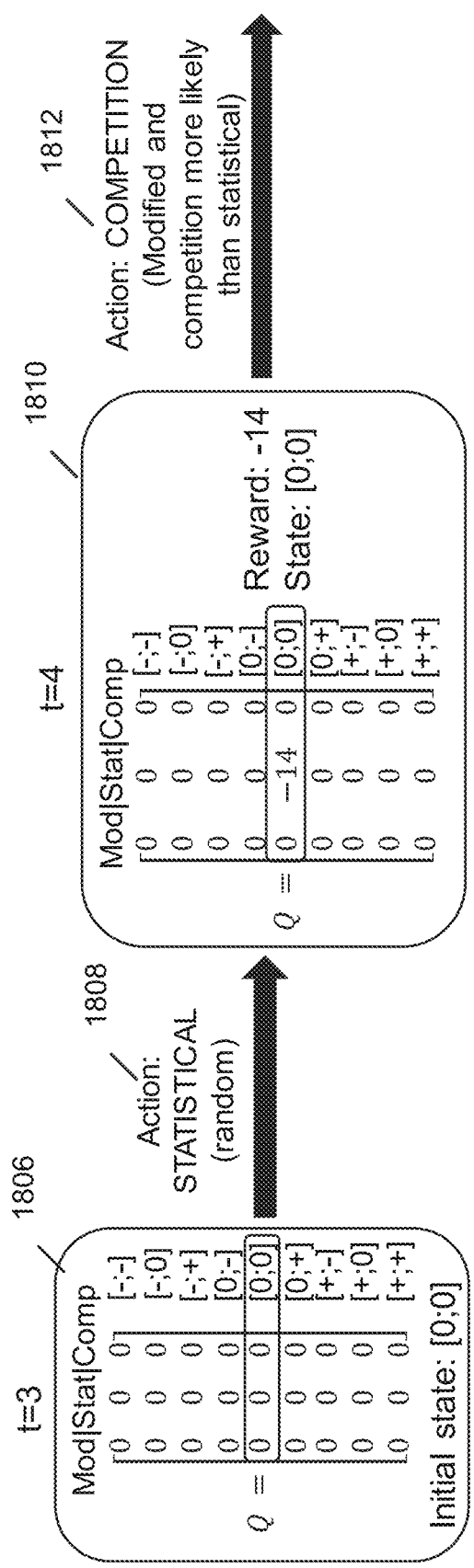
FIG. 18 illustrates an iteration of state navigation according to an embodiment.

FIG. 18 illustrates an iteration 1802, based on an example use case scenario. A table 1804 is shown storing values for indicators of time periods, respective actual values, respective modified forecasts, respective statistical forecasts, and respective competition forecasts. An example Q matrix 1806 is shown for time t=3. As shown, entries of Q matrix 1806 are all zero. An action: Statistical (1808) is shown to advance to a next state, indicated by a Q matrix 1810, at time t=4.

A reward value of −14 is indicated in a "statistical" column of Q matrix 1810, with state value [0,0]. As shown in FIG. 18, a next action 1812 (from time t=4) is indicated as Competition, based on modified and competition determined as more likely than statistical.

Implementations of the various techniques described herein may be implemented in digital electronic circuitry, or in computer hardware, firmware, software, or in combinations of them (e.g., an apparatus configured to execute instructions to perform various functionality).

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a non-transitory "computer-readable storage medium" or a "computer-readable storage device."

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor may receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

We claim:

1. A method comprising:
    determining a result of hierarchical, clustered reinforcement learning by:
        obtaining a plurality of subject objects,
        determining a plurality of clusters of the subject objects,
        wherein each subject object is associated with a cluster ID to allow members of each respective cluster to be efficiently stored and speedily accessed using a filtering operation to facilitate distributed training,
        performing an initial clustered reinforcement learning on each cluster of the plurality of clusters, including training a respective cluster agent for each cluster,
        wherein the initial clustered reinforcement learning on each cluster is performed using a first Q-Learning algorithm using a single Q matrix created for each cluster, the single Q matrix being associated with each subject object in the respective cluster, thereby reducing training time,
        after performing the clustered reinforcement learning on each cluster of the plurality of clusters, determining whether to revise each cluster,
        selecting a first cluster of the plurality of clusters for revision based on at least one selection criterion, wherein the at least one selection criterion includes at least one of selecting a most valuable cluster and selecting a most noisy cluster,
        wherein the selecting the first cluster of the plurality of clusters for revision is based on the determination whether to revise each cluster, and
        after selection of the selected first cluster, performing an additional individual reinforcement learning on each subject object included in the selected first cluster, including training a respective individual agent for each individual subject object,
        wherein the additional individual reinforcement learning is performed using a second Q-Learning algorithm using a single Q matrix created for each subject object, thereby improving the quality of reinforcement learning for the selected first cluster,
        wherein the additional individual reinforcement learning is performed for a portion of the plurality of subject objects, by filtering out subject objects determined as having good results from the initial clustered reinforcement learning; and
    controlling an action based on the result of the hierarchical, clustered reinforcement learning,
    wherein controlling the action based on the result of the hierarchical, clustered reinforcement learning further includes controlling the action based on one of the clusters that is not selected by the selecting for revision.

2. The method of claim 1, wherein determining the result of the hierarchical, clustered reinforcement learning includes using an autonomous planner to automatically select optimal forecasts for the plurality of subject objects.

3. The method of claim 1, wherein controlling the action based on the result of the hierarchical, clustered reinforcement learning includes controlling the action via an autonomous planner.

4. The method of claim 1, wherein the plurality of subject objects include patient characteristics for a specific disease and the controlling the action includes providing treatment to a patient based on the result of the hierarchical, clustered reinforcement learning.

5. The method of claim 1, wherein:
    determining whether to revise each cluster includes analyzing a history of determined quality values of prior results of hierarchical, clustered reinforcement learning,
    wherein the history includes historical data associated with automated forecasts.

6. The method of claim 1, wherein the controlling the action includes sending at least one subject object for delivery based on the result of the hierarchical, clustered reinforcement learning using an autonomous planner.

7. The method of claim 1, wherein:
    the subject objects include stock keeping units (SKUs); and
    controlling the action based on the result of the hierarchical, clustered reinforcement learning includes controlling the action based on a forecast associated with one of the SKUs via an autonomous planner.

8. The method of claim 1, wherein controlling the action based on the result of the hierarchical, clustered reinforcement learning includes controlling the action via an autonomous planner that selects a forecast from a plurality of available forecasts associated with one of the subject objects.

9. A non-transitory computer-readable medium storing software comprising instructions that are executable by one or more device processors to:
    determine a result of hierarchical, clustered reinforcement learning by:
        obtaining a plurality of subject objects,
        determining a plurality of clusters of the subject objects,
        wherein the subject objects include stock keeping units (SKUs),
        wherein each subject object is associated with a cluster ID to allow members of each respective cluster to be efficiently stored and speedily accessed using a filtering operation to facilitate distributed training,
        performing an initial clustered reinforcement learning on each cluster of the plurality of clusters, including training a respective cluster agent for each cluster,
        wherein the initial clustered reinforcement learning on each cluster is performed using a first Q-Learning algorithm using a single Q matrix created for each cluster, the single Q matrix being associated with each subject object in the respective cluster, thereby reducing training time,
        selecting a first cluster of the plurality of clusters for revision based on at least one selection criterion, wherein the at least one selection criterion includes at least one of selecting a most valuable cluster and selecting a most noisy cluster, and
        after selection of the selected first cluster, performing an additional individual reinforcement learning on each subject object included in the selected first cluster, including training a respective individual agent for each individual subject object,
        wherein the additional individual reinforcement learning is performed using a second Q-Learning algorithm using a single Q matrix created for each subject object, thereby improving the quality of the reinforcement learning for the selected first cluster,
        wherein the additional individual reinforcement learning is performed for a portion of the plurality of subject objects by filtering out subject objects determined as having good results from the initial clustered reinforcement learning; and control an action based on the result of the hierarchical, clustered reinforcement learning;

wherein controlling the action based on the result of the hierarchical, clustered reinforcement learning includes controlling the action based on a forecast associated with one of the SKUs via an autonomous planner.

10. The non-transitory computer-readable medium of claim 9, wherein determining the result of the hierarchical, clustered reinforcement learning includes using an autonomous planner to automatically select optimal forecasts for the plurality of subject objects.

11. The non-transitory computer-readable medium of claim 9, wherein controlling the action based on the result of the hierarchical, clustered reinforcement learning includes controlling the action via an autonomous planner.

12. The non-transitory computer-readable medium of claim 9, wherein the instructions are executable by the one or more device processors to:

after performing the clustered reinforcement learning on each cluster of the plurality of clusters, determine whether to revise each cluster;

wherein the selecting the first cluster of the plurality of clusters for revision is based on the determination to revise each cluster.

13. The non-transitory computer-readable medium of claim 12, wherein:

determining whether to revise each cluster includes analyzing a history of determined quality values of prior results of hierarchical, clustered reinforcement learning, wherein the history includes historical data associated with automated forecasts.

14. The non-transitory computer-readable medium of claim 12, wherein:

controlling the action based on the result of the hierarchical, clustered reinforcement learning further includes controlling the action based on one of the clusters that is not selected by the selecting for revision.

15. The non-transitory computer-readable medium of claim 9, wherein the plurality of subject objects include patient characteristics for a specific disease and the controlling the action includes providing treatment to a patient based on the result of the hierarchical, clustered reinforcement learning.

16. The non-transitory computer-readable medium of claim 9, wherein controlling the action based on the result of the hierarchical, clustered reinforcement learning includes controlling the action via an autonomous planner that selects a forecast from a plurality of available forecasts associated with one of the subject objects.

17. A system comprising:

a device processor; and a non-transitory computer readable medium storing instructions that are executable by the device processor to:

determine a result of hierarchical, clustered reinforcement learning by:

obtaining a plurality of subject objects, determining a plurality of clusters of the subject objects, wherein each subject object is associated with a cluster ID to allow members of each respective cluster to be efficiently stored and speedily accessed using a filtering operation to facilitate distributed training, performing an initial clustered reinforcement learning on each cluster of the plurality of clusters, including training a respective cluster agent for each cluster, wherein the initial clustered reinforcement learning on each cluster is performed using a Q-Learning algorithm using a single Q matrix created for each cluster, the single Q matrix being associated with each subject object in the respective cluster, thereby reducing training time, selecting a first cluster of the plurality of clusters for revision based on at least one selection criterion, wherein the at least one selection criterion includes at least one of selecting a most valuable cluster and selecting a most noisy cluster, and after selection of the selected first cluster, performing an additional individual reinforcement learning on each subject object included in the selected first cluster, including training a respective individual agent for each individual subject object, wherein the additional individual reinforcement learning is performed using a Q-Learning algorithm using a single Q matrix created for each subject object, thereby improving the quality of the reinforcement learning for the selected first cluster, wherein the additional individual reinforcement learning is performed for a portion of the plurality of subject objects by filtering out subject objects determined as having good results from the initial clustered reinforcement learning; and control an action based on the result of the hierarchical, clustered reinforcement learning, wherein controlling the action based on the result of the hierarchical, clustered reinforcement learning includes controlling the action via an autonomous planner that selects a forecast from a plurality of available forecasts associated with one of the subject objects.

18. The system of claim 17, wherein the instructions are executable by the device processor to:

after performing the clustered reinforcement learning on each cluster of the plurality of clusters, determine whether to revise each cluster;

wherein the selecting the first cluster of the plurality of clusters for revision is based on the determination to revise each cluster.

19. The system of claim 17, wherein determining the result of the hierarchical, clustered reinforcement learning includes using an autonomous planner to automatically select optimal forecasts for the plurality of subject objects.

20. The system of claim 17, wherein the plurality subject objects include patient characteristics for a specific disease and the controlling the action includes providing treatment to a patient based on the result of the hierarchical, clustered reinforcement learning.

* * * * *